United States Patent Office 2,860,363
Patented Nov. 18, 1958

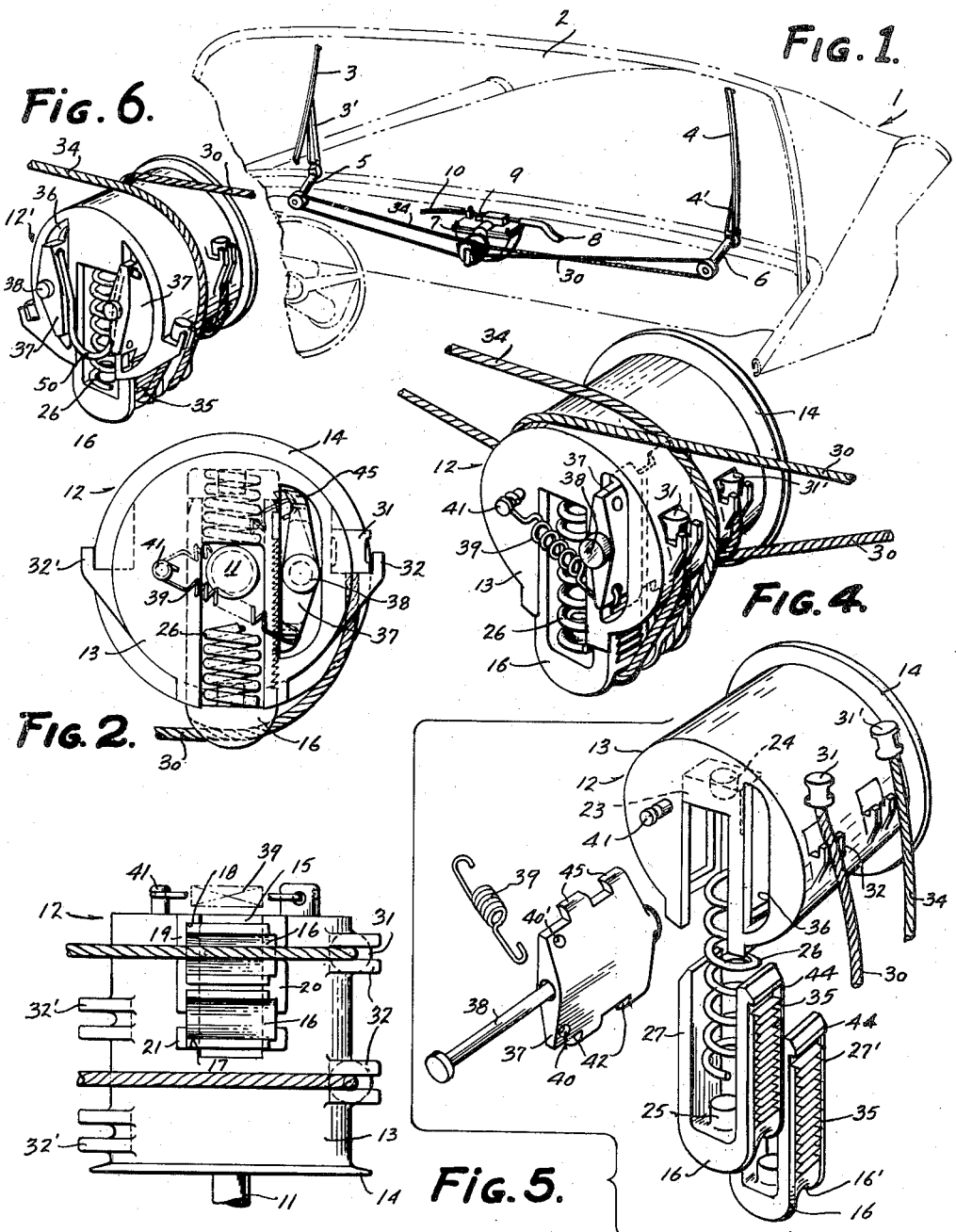

2,860,363

CABLE TENSIONER FOR WINDSHIELD CLEANER TRANSMISSION

Sheldon J. Howard, Buffalo, and George O. Bartoo, Eden, N. Y., assignors to Trico Products Corporation, Buffalo, N. Y.

Application July 26, 1957, Serial No. 674,475

10 Claims. (Cl. 15—253)

This invention relates generally to the vehicle window cleaning art, and more particularly to a new and useful means for tensioning the cable drive of a wiper system.

Where flexible drive cables are employed to transmit the motion of the wiper motor to the wipers, the drive cables must at all times be under the correct tension for proper operation. To this end, the drive cables must be properly tensioned at the time of installation, and any slack developing in use be taken up.

It is known to tension a wiper drive cable by means of parts engaging the same, with one part moving relative to the other under the influence of a compression spring to tension the cable, and wherein the parts normally are locked against relative movement, such as, for example, the centralized tensioner disclosed in United States Letters Patent 2,753,584 issued July 10, 1956. At the time of installation, the locking means are released to permit relative movement of the parts to properly tension the cable, whereupon they are locked against movement. Whenever it is desired to make further adjustments, to take up slack resulting from use, the parts are unlocked to permit the desired tensioning action, following which they are again locked.

It is a primary object of this invention to provide a wiper drive cable tensioning means which, when once activated, will at all times maintain the drive cables under proper tension, automatically adjusting itself to take up any slack, all without further attention.

Another object is to provide the foregoing in a mechanism which is relatively simple and compact, which is readily and relatively inexpensively fabricated, assembled and installed, and which is extremely durable and dependable in operation.

In one aspect thereof, a wiper drive cable tensioning mechanism constructed in accord with the instant invention is characterized by the provision of a drum about which a drive cable is partially wrapped, together with a tensioning member movable relative to the drum and arranged to engage the cable, spring means normally urging the member against the cable to tension the same, and means automatically holding the tensioning member against movement in the opposite direction while at all times permitting spring induced tensioning movement thereof.

The foregoing and other objects, advantages and characterizing features of a wiper drive cable tensioning mechanism constructed in accord with the instant invention will become clearly apparent from the ensuing detailed description of certain presently preferred embodiments thereof, together with the accompanying drawing wherein like reference numerals denote like parts throughout the various views and wherein:

Fig. 1 is a generally perspective view of a windshield cleaner incorporating a cable tensioning mechanism of the instant invention installed in place on a vehicle, which latter is illustrated fragmentarily by broken lines;

Fig. 2 is an end elevational view of the cable tensioning mechanism;

Fig. 3 is a bottom plan view thereof;
Fig. 4 is a perspective view thereof;
Fig. 5 is an exploded perspective view thereof; and
Fig. 6 is a view similar to Fig. 4, illustrating a modified embodiment.

Referring now to the accompanying drawing, and initially to the embodiment illustrated in Figs. 1–5, the numeral 1 generally indicates an automotive vehicle having a windshield 2 and wipers 3 and 4 carried on spring pressed arms 3' and 4', respectively, in turn mounted on rockshafts 5 and 6, respectively. A motor 7, which can be a conventional, vacuum type of motor having a line 8 to a source of suction, not illustrated, and a control valve 9 actuated by a cable 10, is mounted in the vehicle in a manner known in the art and requiring no further illustration. Motor 7 is provided with a drive shaft 11 which carries at its outer end the tensioning mechanism generally designated 12.

The tensioner comprises a driving drum 13 which can have on its rearward edge a flange 14 and which is formed with transverse, generally radial and axially spaced communicating slots 15 slidably receiving a pair of tensioning members 16. Members 16 are confined by inner and outer side edge portions 17 and 18 of slots 15 and by side edge portions 19, 20 and 21 formed around the bottom openings thereof (Fig. 3), whereby members 16 are spaced apart axially of drum 13 and are separately movable generally radially thereof.

At their upper end, each slot 15 is formed with a pocket 23 containing a depending boss 24, and each slide member 16 is of generally U-shape, having on the inner face of its bight portion an upstanding boss 25, the alined bosses 24 and 25 serving to mount a compression spring 26 between the opposite side leg portions 27, 27' of each member 16 for urging said members outwardly relative to drum 13.

A drive cable 30 is provided at one end with an enlarged anchor 31 which seats within a claw shaped terminal post 32 on drum 13, the cable 30 then being wrapped partially around the drum, over the outermost tensioning member 16 and around a driven drum on rockshaft 6, having at its opposite end a similar anchoring enlargement engaging a like terminal 32' on the opposite side of drum 13. Similarly, a cable 34 has at one end an anchoring enlargement engaging a terminal 32' and partially wrapped around drum 13 and around the other tensioning member 16, around a drum on the other rockshaft 5 and back, with an anchoring enlargement 31' engaging a terminal 32 on the opposite side of drum 13. The bight portion of each tensioning member 16 is grooved on its outer surface, as indicated at 16', to receive and retain the cables 30, 34, and as seen from Figs. 2 and 4 the springs 26 independently urge the tensioning members 16 outwardly of drum 13 in a manner tensioning the cables 30 and 34.

In this way, tensioning members 16 are constantly urged by their springs 26 in a direction to tension cables 30 and 34. However, while springs 26 are made sufficiently strong to place the cables under the desired tension when they are inactive, the cables are subjected to a much greater tension when active and it is necessary to provide means to prevent compression of the springs 26 during operation of the wiper system.

In the illustrated embodiments, such means comprise a ratchet and pawl, with side leg portions 27' of tensioning members 16 being provided with a longitudinal series of ratchet teeth 35. An opening 36, slightly offset from slots 15, extends axially into drum 13 from the outer end thereof, and loosely receives a pawl member 37 held therein by a pin 38. Pawl 37 is permitted limited pivoting about the axis of pin 38, which is parallel to the axis of drive shaft 11, and a spring 39 extends between the lower end of ratchet 37, engaging in an opening 40 therein, and a pin 41 spaced across slots 15 on drum 13.

Therefore, spring 39 urges the axially spaced teeth 42 on the bottom edge of pawl 37 into engagement with the ratchet teeth 35 of tensioning members 16, to automatically hold them against retraction inwardly of drum 13 under the increased tension on the cables when the system is active, while at all times enabling tensioning movement of members 16 radially outwardly whenever the cables 30 and 34 are inactive. In other words, pawl 37 automatically prevents retraction of members 16, against springs 26, without in any way interfering with advancing, tensioning movement thereof under the urging of springs 26, whereby the cable tension is automatically adjusted, as necessary, each time the wipers are parked.

For convenience in handling the tensioning mechanism, prior to installation thereof, means are provided for holding the tensioning slide members 16 in their fully retracted position. Such means can conveniently comprise an enlarged and oppositely directed ratchet tooth 44 at the upper end of each side leg 27', for being engaged by axially spaced teeth 45 on the upper end of pawl member 37. Thus, following assembly the tensioning members 16 are pushed inwardly against the urging of their springs 26 to their fully retracted position, and pawl 37 is pivoted in a direction to cause the teeth 45 thereof to engage beneath the enlarged ratchet teeth 44 on each tensioning member, this being the cocked position of member 37 illustrated in broken lines in Fig. 2, whereupon the tensioning members are held in their fully retracted position until such time as the installer pivots the pawl member 37 in the opposite direction to tension the cables following installation of the cleaner.

Springs 26 are of sufficiently greater strength than spring 39 to effectively hold pawl member 37 in its cocked position, prior to release of the tensioning members, although if desired the position of spring 39 can be reversed, causing the spring to engage the opening 40' in pawl 37 on the opposite side of pivot pin 38, as illustrated in broken lines in Fig. 2.

Thus, prior to and during installation the tensioning members 16 are held conveniently retracted, whereby the cleaner is readily installed on the vehicle with the cable ends 31 and 31' being engaged in the terminals 32 and 32'. Then, when the cleaner has been installed, pawl member 37 is simply pivoted to the position thereof illustrated in full lines in the drawing, whereupon the springs 26 urge the tensioning members 16 outwardly of drum 13 against the cables 30 and 34 to automatically and individually properly tension the same. The pawl teeth 42 engage the ratchet teeth 35 on each tensioning member to hold the same against retraction, at any adjusted position of the tensioning members, and it is noted that the members 16 can project an unequal extent, relative to each other, whereby the cables are independently tensioned by the members with the teeth 42 of pawl member 37 effectively holding the two tensioning members in whatever position they assume.

A slightly modified, somewhat cumulative embodiment is illustrated in Fig. 6, wherein the parts generally remain the same, the tensioning mechanism being designated 12' and being distinguished from the embodiment of Figs. 1–5 by the provision of two recesses 36, one on each side of tensioning members 16, with a pawl 37 in each recess. Ratchet teeth 35 are provided on each side leg 27 and 27' of each tensioning member 16, which ratchet teeth are engaged by the teeth 42 of the respective pawl members 37. The ratchet teeth 35 on one side leg 27 or 27' of each tensioning member are staggered with respect to the ratchet teeth 35 on the other side leg, thereby providing a much finer increment of adjustment in that the teeth 42 of one pawl member 37 will engage the ratchet teeth 35 of the one side leg, or the teeth 42 of the other pawl 37 will engage the ratchet teeth 35 of the other side leg, which are disposed between the ratchet teeth of the one side leg, to provide increments of adjustment twice as fine as those provided in the embodiment of Figs. 1 through 5. Here again a spring member 50 is provided for biasing the pawl members 37 to engage the ratchet teeth 35.

The same enlarged teeth 44 will be provided for being engaged by pawl teeth 45, and while springs 26 will hold the pawl members in their cocked position, the spring 50, which is of diverging, generally U-shape, can be reversed with its opposite side legs engaged in holes on the pawl members on opposite sides of the pivot pins 38, to assist in holding them in cocked position.

Accordingly, it is seen that the instant invention fully accomplishes its intended objects, and provides a tensioning mechanism which is available at all times to automatically adjust the tension on drive cables 30 and 34 whenever the latter are inactive, and which automatically holds the tensioning members in their adjusted position when the cables become active, all without any attention whatever.

While only two embodiments have been disclosed and described in detail, it is not intended that this invention be limited thereto. Various modifications and variations will occur to those skilled in the art without departing from the spirit of this invention and the scope of the appended claims.

Having fully disclosed and described the instant invention, together with its mode of operation, what is claimed as new is:

1. In a windshield cleaner transmission, drum means, a cable having a partial wrap about said drum means, a cable tensioning slide member carried by said drum means for movement relative thereto and engaging said cable, spring means urging said slide member against said cable to tension the same, and means automatically holding said slide member against movement in the opposite direction while at all times enabling such spring urged tensioning action of said slide member.

2. In a windshield cleaner transmission, drum means, cable means having a partial wrap about said drum means, a tensioning member carried by said drum means for movement relative thereto and engaging said cable means, spring means urging said tensioning member against said cable means in a manner to tension the same, and means automatically holding said tensioning member against movement in the opposite direction while at all times permitting movement of said tensioning member under the urging of said spring means.

3. In a windshield cleaner transmission, drum means, cable means having a partial wrap about said drum means, a tensioning member carried by said drum means and engaging said cable means, spring means constantly urging said tensioning member against said cable means to tension the same, and means for automatically precluding movement of said tensioning member against the urging of said spring means while at all times enabling spring urged cable tensioning movement of said member, said last-named means including ratchet teeth on said member and pawl means carried by said drum means for engaging said teeth.

4. In a windshield cleaner transmission, drum means, cable means having a partial wrap about said drum means, a tensioning member carried by said drum means for movement relative thereto, spring means urging said tensioning member against said cable means to tension the same, and means automatically operable to hold said member against movement in the opposite direction while at all times enabling spring urged tensioning movement thereof, said last-named means including ratchet teeth and cooperating pawl means for engaging the same, one of said teeth and pawl means being carried by said member and the other thereof being carried by said drum means.

5. In a windshield cleaner transmission, drum means, cable means having a partial wrap about said drum means, a tensioning member carried by said drum means for movement relative thereto, spring means urging said tensioning member against said cable means, and means operable automatically to hold said member from movement against the urging of said spring means while at all times enabling spring urged tensioning movement of said member, said last-named means including spaced series of ratchet teeth on one of said member and said drum means and cooperating pawl means on the other thereof, the ratchet teeth of one of said series being in staggered relation to the ratchet teeth of the other of said series for alternate engagement of said spaced series of ratchet teeth by said pawl means.

6. In a windshield cleaner transmission, drum means, cable means having a partial wrap around said drum means, a tensioning member carried by said drum means for movement relative thereto, spring means urging said tensioning member against said cable means to tension the same, means automatically operable to hold said member against movement in opposition to said spring means while at all times permitting spring urged tensioning movement of said member, and means for releasable locking said member in a retracted position.

7. In a windshield cleaner transmission, drum means, a tensioning member carried by said drum means for movement relative thereto and having a grooved outer end, cable means having a partial wrap around said drum means and lying in said grooved outer end of said tensioning member, spring means urging said tensioning member in a direction to tension said cable means, and means automatically operable to hold said tensioning member against movement in the opposite direction while at all times permitting spring urged cable tensioning movement thereof.

8. In a windshield cleaning system, a motor, a plurality of wipers, drum means connected to said motor for being driven thereby, drive cables having at least a partial wrap about said drum means and operatively connecting said wipers thereto, a tensioning member for each drive cable carried by said drum means for movement relative thereto, spring means independently urging said tensioning members against said drive cables to tension the same, and means automatically operable to restrain said tensioning members from movement against the urging of said spring means while at all times enabling spring urged cable tensioning movement thereof, said last-named means including ratchet teeth carried by said tensioning members and pawl means common thereto carried by said drum means.

9. In a windshield cleaner, a wiper motor, a wiper, means including a drum and a flexible cable having a partial wrap thereabout for transmitting motion from said motor to said wiper, and cable tensioning means including a generally U-shaped tensioning member slidable in a transverse slot in said drum, spring means confined between the opposite side leg portions of said member and urging the bight portion thereof against said cable to tension the same, and means for holding said member against retreating movement into said drum while at all times permitting advancing movement thereof to tension said cable, said last-named means including ratchet teeth along at least one of said side leg portions, a pawl member pivoted on said drum for engaging said teeth, and means urging said pawl member into engagement with said ratchet teeth.

10. In a windshield cleaner system, a motor, a wiper, means including a drum and a flexible cable having a partial wrap about said drum operatively connecting said wiper to said motor, cable tensioning means including a tensioning member carried by said drum for movement relative thereto, spring means urging said member against said cable to tension the same, ratchet teeth carried by said member, a pawl member carried by said drum, means normally urging said pawl member into engagement with said ratchet teeth to restrain said tensioning member from movement against the urging of said spring means while permitting tensioning movement of said tensioning member, and means for releasably holding said tensioning member in a retracted position including an oppositely directed tooth carried by said tensioning member, said pawl member being selectively pivotable out of engagement with said ratchet teeth and into engagement with said oppositely directed tooth.

References Cited in the file of this patent

UNITED STATES PATENTS

| 2,581,080 | Cushman | Jan. 1, 1952 |
| 2,611,148 | Rappl | Sept. 23, 1952 |
| 2,753,584 | Oishei | July 10, 1956 |
| 2,795,145 | McClelland | June 11, 1957 |
| 2,810,300 | Pigford | Oct. 22, 1957 |

FOREIGN PATENTS

| 760,893 | Great Britain | Nov. 7, 1956 |
| 1,096,059 | France | June 8, 1955 |